United States Patent [19]

Lanier et al.

[11] 4,081,593

[45] Mar. 28, 1978

[54] PROCESS FOR PRODUCING PHOSPHAZENE FIRE RETARDANT

[75] Inventors: Carroll W. Lanier, Baker; James T. F. Kao, Baton Rouge, both of La.

[73] Assignee: Ethyl Corporation, Richmond, Va.

[21] Appl. No.: 652,639

[22] Filed: Jan. 26, 1976

Related U.S. Application Data

[60] Division of Ser. No. 529,760, Dec. 5, 1974, Pat. No. 3,974,242, which is a continuation-in-part of Ser. No. 369,171, Jun. 12, 1973, abandoned.

[51] Int. Cl.$^2$ .................... C08B 16/00; D06M 13/26; D06M 15/00
[52] U.S. Cl. ................................ 536/57; 8/116 R; 260/DIG. 24; 536/60; 536/61
[58] Field of Search .................. 536/57, 60, 61

[56] References Cited

U.S. PATENT DOCUMENTS

| | | | |
|---|---|---|---|
| 2,909,446 | 10/1959 | Redfarn | 106/15 FP |
| 3,869,294 | 3/1975 | Lanier et al. | 260/927 N |

*Primary Examiner*—Ronald W. Griffin
*Attorney, Agent, or Firm*—Donald L. Johnson; John F. Sieberth; James M. Pelton

[57] ABSTRACT

A process for producing fire retardant phosphonitrilate polymers by reacting phosphonitrilic halide with a hydroxyl compound such as an aliphatic or aromatic alcohol at not more than about 40° C in the presence of an acid acceptor, such as pyridine, under conditions such that a relatively low concentration of the hydroxyl compound is present during the initial ½ to 3 hours of the reaction and the reaction conditions are maintained at from 20°–50° C for a period of ½ to 120 hours and, optionally, further heating the reaction mixture to a temperature of 40°–80° C for ½ to 8½ hours. The phosphonitrilate polymers are suitable for fire retarding cellulosic materials such as regenerated cellulose, rayon and the like.

2 Claims, No Drawings

PROCESS FOR PRODUCING PHOSPHAZENE FIRE RETARDANT

This is a division of application Ser. No. 529,760, filed Dec. 5, 1974, now U.S. Pat. No. 3,974,242, which in turn is a Continuation-in-part of application Ser. No. 369,171, filed June 12, 1973, now abandoned.

BACKGROUND OF THE INVENTION

The reaction of a phosphonitrilic halide and an alcohol in the presence of pyridine is known. According to Dutch Patent Publication 71/06772, hexa-alkoxy phosphazene is prepared in a known manner by reacting phosphorus pentachloride and ammonium chloride in the presence of a solvent and after separation of the solid components the reaction mixture is reacted with a univalent alcohol and pyridine. The resultant pyridine hydrochloride is treated with lye to produce a pyridine water fraction from which the pyridine is regenerated. The organic fraction remaining after separation of the aqueous pyridine fraction is separated into the alkoxy phosphazene and a solvent-rich liquid phase. The difficulty with this process is that in the preparation of the alkoxy phosphazene and the purification of pyridine different solvents are used making necessary separate regenerations. According to the invention in the Dutch Patent Publication, chlorobenzene is used as the reaction medium for producing hexachlorophosphazene and the alkoxyphosphazene. The pyridine is recovered from the aqueous fraction by extraction with the solvent-rich liquids after separation of the alkoxyphosphazene, followed by distillation of the resultant extract. Thus, auxiliary agents such as the pyridine acid fixing agent and solvents are regenerated and used for recycle.

In a paper by Dishon, Journal of the American Chemical Society, Volume 71, p. 2251 (1949), cyclic trimeric phosphonitrilic chloride in pyridine was reacted with butyl alcohol at 0° C with vigorous stirring to produce the dibutylester of phosphonitrilic chloride. Further, Audrieth et al in a paper in Chemical Review, Volume 32, pp. 129–130 (1943) discloses the reaction of phosphonitrilic chlorides with alcohols in the presence of pyridine. However, no indication of the method of reaction or the conditions of reaction were indicated in this paper. Audrieth et al refers to Wissemann who used alcohols with or without pyridine as condensing agent at elevated temperatures. However, a number of possible reactions were believed to take place in this type of reaction which would lead to undesirable side reactions, particularly the reaction of the phosphonitrilate ester with HCl to produce P-O-H bonds. These species increase water solubility and hence are undesirable in a flame retardant incorporated in a material which is subject to numerous launderings.

From the previously described prior art, the processes disclosed appear to produce only the ordinarily expected fully substituted or fully esterified phosphonitrilate polymers, e.g., hexapropoxyphosphazene or hexapropoxy phosphonitrilate polymers. In contrast, according to the present invention there is believed to occur a simultaneous substitution or esterification and condensation whereby products are produced having entirely different properties, insofar as chemical and physical properties, as well as, advantageous, and superior qualities for flame retardant applications, from prior art process materials.

As far as can be determined, the process of the present invention has not heretofore been disclosed or recognized for producing products of superior efficacy for fire retarding cellulosic materials. According to this invention, a phosphonitrilate polymer is produced which exhibits a relationship of viscosity to molecular weight which is surprising from a knowledge of prior art phosphonitrilate polymer and which is believed to provide superior retention and flame retardance in the regenerated cellulose or rayon fiber at concentrations lower than previously considered practical.

SUMMARY OF THE INVENTION

According to the invention a phosphonitrilate polymer suitable for fire retarding cellulosic materials, is produced by a process comprising reacting, in the presence of an acid acceptor, a phosphonitrilic halide with a hydroxyl compound selected from aliphatic alcohols having from one to about six carbon atoms and aromatic alcohols having from six to about ten carbon atoms according to the steps of (a) contacting a mixture of said phosphonitrilic halide and said acid acceptor with at least about 85 weight percent of the theoretical amount based on said phosphonitrilic halide of said hydroxyl compound at a temperature of not more than about 40° C, whereby a relatively low concentration of said hydroxyl compound to said phosphonitrilic halide is present during the initial ½ to about 3 hours of the reaction, allowing condensation to occur between intermediate phosphonitrilate, alkoxy or aryoxy ester species and phosphonitrilic halides or partially esterified phosphonitrilates with the evolution of an alkyl or aryl halide compound, and (b) thereafter, maintaining the reaction mixture at a temperature of from about 20 to about 50° C for a period of from about ½ to about 120 hours.

In a more preferred embodiment, after the above procedure has been completed, the reaction is further heated to a temperature of 40°–80° C for a period of from ½ to about 8½ hours. Preferred acid acceptors are tertiary amines, most preferably, pyridine. The hydroxyl compound may be selected from an aliphatic alcohol and aromatic alcohol which is independently and preferably propanol or phenol.

The product prepared according to the above process is also a preferred embodiment of this invention. It provides an excellent fire retardant for cellulosic materials, such as regenerated cellulose or rayon. Another preferred embodiment of this invention is regenerated cellulose containing a flame retardant amount of the product produced by the process of this invention. Also, this invention provides a method for preparing flame retardant regenerated cellulose filaments which comprises mixing viscose and a flame retardant product of this invention, shaping the mixture into a filament and coagulating and regenerating the filament.

DESCRIPTION OF THE PREFERRED EMBODIMENTS

According to this invention a phosphonitrilate polymer is produced by reacting, in the presence of an acid acceptor, a phosphonitrilic halide and a hydroxyl compound under conditions which are given in more detail below. The phosphonitrilic halide or chlorophosphazene starting material generally can be illustrated by the formula

where X is a halogen, such as fluorine, chlorine or bromine, preferably chlorine, and n is an integer of at least 3. More preferably n is an integer from 3 to about 8. The phosphonitrilic halide can be linear, cyclic or mixtures of these. In general, processes for producing phosphonitrilic halides provide a crude mixture containing from 50 to about 95 weight percent cyclic materials, for example cyclic trimer, tetramer, pentamer, hexamer, heptamer and so on, and the remainder linears. Although pure cyclic phosphonitrilic halides, having the linear isomers separated therefrom, can be used as the starting materials of this invention, a mixture of cyclic and linear isomers is satisfactory and preferred because of their inexpensive and more practical processes of production. The mixed cyclic and linear isomers of phosphonitrilic halide are generally an oily viscous slurry at room temperature, although many of the pure materials are solid under normal conditions.

The phosphonitrilic halides useful in this invention can be produced according to known methods by 1. reacting phosphorus, ammonia and chlorine according to U.S. Pat. No. 3,658,487;
2. reacting phosphorus trichloride, chlorine and ammonium chloride according to U.S. Pat. No. 3,359,080;
3. reacting phosphorus pentachloride and ammonium chloride according to U.S. Pat. No. 3,367,750; or
4. reacting phosphorus pentachloride and ammonia according to U.S. Pat. No. 3,656,916.

Other known procedures for producing phosphonitrilic halides are found in *Am. Chem. J.*, 19, 728 (1897), *Berichte*, 57B, 1343 (1924), U.S. Pat. No. 2,788,286; 3,008,799; 3,249,397; 3,347,643; 3,372,005; 3,378,353; 3,379,511; 3,407,047; 3,462,247; Netherlands 70/05128; and *J. Chem. Soc.*, A, pp. 768–772. Each of the foregoing references is hereby incorporated herein as if fully set forth.

A preferred method for preparing phosphonitrilic halides for use in this invention may be described as follows: Phosphorus pentachloride slurried in monochlorobenzene is charged to a reactor. The reactor is sealed and gaseous HCl introduced with agitation to assist solution of the HCl in monochlorobenzene. The reactor is pressurized with from about 10 to about 40 psig with gaseous HCl. Ammonia is then introduced at a rate not less than 0.13 liters per minute per mole of $PCl_5$ and heat is applied to raise the temperature of the reaction mixture to 110° C to 150° C during this initial ammonia feed. The hydrogen chloride pressure will fall at first, and additional hydrogen chloride can be added to maintain the desired pressure. However, this is not essential if the initial pressure is at least 10 psig at the start of ammonia feed since by-product hydrogen chloride will be produced before all of the preadded hydrogen chloride is used up. The reaction between ammonium chloride and $PCl_5$, initiates at about 60° C. The temperature rises to about 110°–140° C. The feed rate of ammonia is reduced after about ½ hour and held to a rate of from about 0.05 to about 0.13 liters per minute per mole of $PCl_5$. This rate is continued for about three hours, or depending upon the amount fed until at least the stoichiometric amount of ammonia is added. After the ammonia has been fed into the reaction, the temperature is maintained for about 1 hour at between 110°–150° C, preferably from 120° C to 130° C under pressure from 10–40 psig and preferably about 20 psig. This heating period finishes the reaction by allowing traces of unreacted material to react. After about 1 hour the pressure is released and heating is continued for another ½ hour at reaction temperature. This allows any remaining hydrogen chloride dissolved in the solvent to be removed.

The product of this reaction is generally 65–75 percent cyclic phosphonitrile chloride polymers and 35–25 percent linear materials. In general, the cyclic distribution ranges from 60–75 percent trimer, 18–24 percent tetramer, and 7–12 percent of pentamer. The product yield ranges upward of 90 percent, based on the amount of phosphorus used. Yields higher than 92 percent are not uncommon. In contrast, products of prior art processes have cyclic products ranging from 80–85 percent cyclic using lower feed rates followed by higher feed rates of ammonia. Moreover, the traditional process for producing phosphonitrile chloride using a solid ammonium chloride of commercial grade and a halogenated aliphatic hydrocarbon solvent produces a generally higher molecular weight product consisting of about 50 percent cyclics and about 50 percent linears.

EXAMPLE I

To a glass reactor equipped with stirrer, a reflux condenser and a means for heating the reactor contents was charged 208.3 grams (1.0 mole) of phosphorus pentachloride in 312.5 grams of monochlorobenzene. The reactor was sealed and anhydrous hydrogen chloride was fed into the reactor with stirring until the pressure of the reactor was about 15 psig. A total of 7.6 grams (0.208 mole) of hydrogen chloride was added to the reactor. Gaseous ammonia was then introduced to the reactor at a rate of 0.182 liters per minute per mole of phosphorus pentachloride while the reactor contents were heated at a rate of 2.5° C per minute using a heating mantle on the reactor. The ammonia feed rate was dropped to 0.0908 liters per minute per mole of phosphorus pentachloride after about 5.46 liters (0.241 mole) of ammonia was fed into the reactor over a period of about 30 minutes. The temperature was controlled at 130° C and pressure at 20.0 psig. The ammonia feed was stopped when a total of 22 liters (1.0 mole) was fed into the reactor. The heating and stirring was continued for one hour at 20 psig, and for another 30 minutes at atmospheric pressure. The total reaction time was 5½ hours. The reactor contents were then cooled to room temperature and discharged from the reactor by nitrogen pressure. About 400 grams of clear product solution was obtained. Analysis by vapor phase chromatograph showed that the solution contained 26.6 percent phosphonitrilic chlorides of which 63.3 percent were cyclic compounds with the following distribution: trimer — 73 percent, tetramer — 20 percent and pentamer — 7 percent. The recovered yield was 92 percent, based on phosphorus pentachloride.

EXAMPLE II

The procedure of Example I was repeated, except that a total of 22.8 liters (1.047 mole) of ammonia was fed to the reactor and the initial heating rate was 1.5° C per minute. The reaction was initiated at 65° C as observed by a sudden change in the rate of temperature increase. The reaction mixture was heated to 130° C over two hours period and held at that temperature for three hours. The product slurry, about 392.5 grams, was obtained after 5½ hours reaction time. Vapor phase chromatograph analysis of the product showed 67.7 percent cyclic phosphonitrilic chloride polymers having the following distribution: trimer — 64 percent, tetramer — 24 percent, pentamer — 12 percent. The recovered yield of total product was 92 percent, based on phosphorus pentachloride.

The procedure of Example I was repeated with different reaction times and temperatures. Ammonia was fed at the same rate with 10 percent excess (1.1 mole total) (Examples III and IV) to 2 percent short (0.98 mole total) (Example V). The results of these experiments are shown in the following table.

TABLE I

PREPARATION OF PHOSPHONITRILIC CHLORIDE

| Example | Reaction Temp. °C | Reaction Time hrs. | Percent Product Distribution | | | Percent Cyclics | Percent Yield |
|---------|-------------------|--------------------|---|---|---|-----------------|----------------|
|         |                   |                    | Trimer | Tetramer | Pentamer | | |
| III     | 120               | 7½                 | 65 | 20 | 15 | 75 | 85 |
| IV      | 140               | 4½                 | 73 | 18 | 9  | 77 | 74 |
| V       | 150               | 4                  | 90 | 8  | 2  | 50 | 80 |

The hydroxyl compound useful in the process of this invention can be any hydroxyl compound capable of reacting with or substituting on or replacing halogen on the phosphonitrilic halide. Selection of the desired hydroxyl compound is not critical and depends to some extent on the end use of the phosphonitrilate polymer produced. Analogs of the hydroxyl function can also be employed, for example mercaptan compounds, which react similarly to the hydroxyl compound. Preferred hydroxyl compounds are aliphatic alcohols having from one to about six carbon atoms and aromatic alcohols having from six to about 10 carbon atoms. Typical of these are methanol, ethanol, propanol, allyl alcohol, isopropanol, butanol, isobutanol, tert-butanol, crotyl alcohol, pentanol, isopentanol, hexanol, phenol, cresol, xylenol, naphthanol, benzyl alcohol, tolyl alcohol, phenylethyl alcohol, xylyl alcohol, phenylpropyl alcohol, tolylcarbinol, pseudocumene alcohol, xylylcarbinol, cumic alcohol, cinnamyl alcohol, xylylene alcohol and the like. Halogenated derivatives of the foregoing hydroxyl compounds, such as, chlorinated and brominated hydroxyl compounds, and particularly, ethylene chlorohydrin, ethylene bromohydrin, 2,3-dibromopropyl alcohol, 2,3-dichloropropyl alcohol and the like are useful hydroxyl compounds in the process of this invention. Mercaptan compounds, which are analogous to the hydroxyl compounds useful in the present process, can also be employed. Representative of useful mercaptan compounds are methyl mercaptan and its homologs ethyl, propyl, butyl, amyl, and hexyl mercaptans, thiophenol, thionaphthols, benzyl mercaptan, cyclohexyl mercaptan and the like. Thus, aliphatic and aromatic mercaptans having from one to about six carbon atoms and from six to about 10 carbon atoms, respectively, and their alkylated and halogenated, particularly chlorinated and brominated derivatives can also be used. Most preferred are propanol and phenol.

The amount of hydroxyl compound employed in the reaction can vary from less than the theoretical amount to a large excess. By theoretical amount is meant the stoichiometric amount, that is the number of equivalents of hydroxyl groups which replace the halide atoms on the phosphonitrilic halide. For example, the cyclic trimeric phosphonitrilic chloride containing six chlorine atoms requires 6 equivalents of a mono alcohol, 3 equivalents of a diol, and 2 equivalents of a triol for stoichiometric or theoretical reaction. In the process of this invention, the amount of hydroxyl compound used is not less than about 85. Practically, amounts of hydroxyl compounds greater than about 180 weight percent of the theoretical amount are not employed. Greater or lesser amounts of hydroxyl compound can be employed but the lesser amounts leave too great an amount of halide atoms in the product for practical subsequent removal and the greater amounts require too much reactor volume for practical operations. Preferably, the amount of hydroxyl compound employed is from about 98 to about 130 weight percent of the theoretical amount. Even though excess hydroxyl compound is employed, the reaction process of this invention does not replace all of the halide groups. The residual halide can be removed according to the processing operations described hereinbelow.

On reaction of the hydroxyl compound and the phosphonitrilic halide there is produced a hydrogen halide. If left in the reaction mixture it would further react to produce undesirable by-products and cause rearrangement of the phosphonitrilate polymer to water soluble species. Thus, the retention properties of the phosphonitrilate polymer in the cellulosic fiber during processing and laundering would be adversely affected. By carrying out the reaction in the presence of a base or an acid acceptor, the hydrogen halide produced is reacted, fixed or complexed and can no longer affect the reaction mixture. Therefore, a suitable base or acid acceptor is one capable of reacting with or complexing with and precipitating out the hydrogen halide produced during the reaction. The particular base or acid acceptor employed is not critical and the choice of a suitable acid acceptor is within the skill of the art. Typical acid acceptor previously employed are alkali and alkaline earth metal hydroxides and carbonates or a tertiary organic amine. Typical are sodium, potassium or calcium hydroxides or carbonates, trimethylamine, triethylamine, tripropylamine, methyldiethylamine, dimethylethylamine, propyldimethylamine, propyldiethylamine, methylethylpropylamine, pyridine, lutidine, colliline, picoline and the like. Pyridine is preferred.

More than theoretical amounts of base or acid acceptor necessary to complex with the hydrogen halide formed are required. In general, from about 2 to about 3 times the weight of the phosphonitrilic halide is employed. Theoretically, one mole of base or acid acceptor for each mole of hydrogen halide formed would be sufficient. However, practical considerations require at least twice the molar amount of base or acid acceptor determined by the number of moles of hydrogen halide formed. This amount provides enough base or acid acceptor to quickly react or complex with the hydrogen halide and enough free acid acceptor serving as a solvent to suspend the reacted or complexed salt so that the system is stirrable.

According to this invention, it has been found that phosphonitrilate polymers having advantageous properties are produced when the reaction of the phosphonitrilic halide and the hydroxyl compound is carried out in the presence of an acid acceptor by adding the hydroxyl compound to the phosphonitrilic halide such that a relatively low concentration of the hydroxyl compound is present during the initial portion of the reaction, for example, during the first ½ to about 3 hours of addition and by maintaining the reaction mixture at a temperature which does not exceed about 40° C. Preferably the temperature is controlled within the range of about 20° to about 40° C, although lower temperatures can also be used, for example, down to about 15° C. However, at much lower temperatures the reaction does not proceed at a sufficiently practical rate. Accordingly, a preferred temperature range for the reaction would be from about 15° to about 40° C, with reaction temperatures from 20° to about 30° C being more preferred. It appears that the reaction temperature during the addition of hydroxyl compound, especially at an early stage of reaction is important because side reaction competition, especially thermal rearrangement to phosphazanes, occurs more readily at higher temperatures.

Also, the concentration of hydroxyl compound during the initial portion of reaction is important. Without limiting the invention to any particular reaction mechanism or mode of operation, it is believed that the concentration of hydroxyl compound is important because two competing and beneficial reactions take place in the process of this invention.

In reacting the phosphonitrilic halide, for example, cyclic trimeric phosphonitrilic chloride, with a hydroxyl compound, for example, propanol, the major expected reaction is the substitution of chlorine with a propoxy group on a phosphorus atom with the resultant release of hydrogen chloride which is reacted or complexed with the base or acid acceptor. A second and important reaction is the interaction of intermediate phosphonitrilic species such as two incompletely substituted cyclic trimer species, one of which contains a phosphorus-propoxy group, or any equivalent residue of the above described aliphatic and aromatic hydroxyl compounds, and the other containing a phosphorus-chloride group or other suitable halide depending on the starting phosphonitrilic halide material, such that condensation occurs resulting in the formation of propyl chloride, or other alkyl or aryl halide as appropriate to the actual materials employed whereby the two phosphonitrilic trimer rings are cross-linked by a P-O-P linkage or bridge. Of course, the briding by P-O-P bond links can occur between various species of phosphonitriliate polymers such that two or more cyclic, linear or cyclic-linear molecules are linked together by one or more P-O-P bond linkages. Because of the complexity of the product and the competition of the reactions for substitution on phosphorus with the hydroxyl compound and for condensation forming P-O-P bond bridges between phosphonitrilate molecules, it is difficult to predict exactly the concentration of hydroxyl compound required at any given point in the reaction. It has been found that addition of the hydroxyl compound over a period of time instead of all at once or at a very high rate provides the relatively low concentration of the hydroxyl compound to the phosphonitrilic halide required to effect both desired reactions, e.g., replacement and condensation as indicated above. Accordingly, it has been found that addition or feed times of from about ½ to about 6 hours or more for the total amount of hydroxyl compound can be used to produce phosphonitrilate polymers having certain advantageous properties. Longer feed times are required in larger reaction equipment in order to handle efficiently the heat load from the exothermic reaction. Also, in equipment of any given size, feeding or addition of hydroxyl compound can be conveniently carried out in a shorter period when reaction temperature is is controlled at the higher end of the temperature range, say about 40° C, and conversely, at lower temperatures, e.g., 15°–20° C, a longer feed time is employed in order to give the desired reactions sufficient time for completion.

After the hydroxyl compound addition is complete, the reaction mixture is maintained at substantially the same conditions for a period of time sufficient to allow residual chloride to react and be removed from the reaction mixture by complexing with the acid acceptor and precipitating. Preferably the reaction mixture is held at a temperature of from about 20° to about 50° C for a period of from about ½ hour to about 120 hours. More preferably, the reaction mixture is maintained at a temperature of from about 20° to about 40° C for a period of from about ½ to about 24 hours.

On completion of this holding step it is sometimes desirable to slightly increase the temperature for a period to insure that the reaction is completed and remove additional residual chloride, thus finishing the reaction. This step is optional and need not be carried out in all instances. Usually analysis of a sample of the product will indicate whether a finish step is required. When used, it is preferred to further heat the reaction mixture to a temperature of from about 40° to about 80° C for a period of from about ½ to about 8½ hours.

In each of the above reaction stages, feeding, holding and finishing, the reaction mixture can be agitated to assure good contact of the reactants. Any suitable agitation means can be employed, such as stirring, as is well known in conventional practice.

Upon completion of the reaction, the reactor contents are filtered to remove the hydrogen halide salt complex or reaction product with base and the excess base or acid acceptor, e.g., pyridine, and hydroxyl compound, if any, are removed. To insure substantially complete removal of base or acid acceptor from the phosphonitrilate polymer, a solvent can be added, the solution filtered to remove any remaining salts, and the solvent containing base or acid acceptor, such as pyridine, evaporated off again. Additionally, a water wash or basic water wash can be employed to neutralize any hydrogen halide remaining uncomplexed and the solution refiltered and the organic layer containing the phosphonitrilate polymer separated and recovered.

The reaction sequence described above allows the phosphonitrilic halide and hydroxyl compound to react in a manner such that only at the end of the feeding stage is there any appreciably high concentration of hydroxyl compound. Thus, during the reaction sequence phosphonitrilate ester and chloride intermediates having halide and alkyl oxide and/or aryloxide groups, as appropriate for the starting materials, condense to evolve alkyl or aryl halide, thus linking the intermediate phosphonitrilate esters together causing an increase of molecular weight of the final phosphonitrilate polymer. The reaction mixture is a highly complex mixture and complete analysis of the intermediates or final products would be impractically complex. Therefore, it is not known with certainty what individual components appear in the reaction intermediates or final product. However, using the reaction procedure described above of the present invention, it is observed that products with relatively high molecular weights and comparatively low viscosities can be made as desired.

The products of the present invention can be characterized as follows:

| | |
|---|---|
| P, wt % | 20-26 |
| N, wt % | 9-12 |
| Total Cl, wt % | 0.5-6.5 |
| Water soluble Cl, wt % | <1 |
| Viscosity at 25° C, cp. | 900-20,000 |
| Molecular weight | 900-1700 |
| Specific gravity | 1.14-1.20 |
| Gardner color | 2-11 |
| Water solubility (wt % P) | 0.01-0.1 |
| 0.5 wt % NaOH solubility (wt % P) | 0.1-0.8 |

By reference to the following examples the invention will be more easily understood. In addition, several examples of processes not in accordance with this invention are given for comparison.

EXAMPLE 1

To a suitable glass reaction vessel was charged 316.4 grams of pyridine and 116 grams of phosphonitrilic chloride having the following analysis:

| | |
|---|---|
| Total cyclics | 71.2 wt % |
| Cyclic distribution | |
| Trimer | 71.9 |
| Tetramer | 22.3 |
| Pentamer 5.8 | |

The reactor contents were maintained at 20° C with stirring and 100 grams of propanol at room temperature were added over a period of 2 hours. Cooling was used to maintain the reaction mixture at 20°-25° C during the addition of propanol because of the exothermic nature of the reaction.

After completing the propanol feed, the reaction mixture was held at 20°-25° C for 24 hours with continued stirring. The reaction mixture was then cooled and filtered. The filtrate, 307.5 grams was divided into two samples. The first, 150 grams, was heated further to 100° C for 2½ hours and resulted in a solid product. The second part of the filtrate, 61.5 grams, was evaporated at 50° C, filtered, washed with 20 cc of saturated aqueous sodium bicarbonate solution, and evaporated again. The product, 50.7 grams, analyzed as follows:

| | |
|---|---|
| P, wt % | 22.2 |
| N, wt % | 9.95 |
| Total Cl, wt % | 5.80 |
| Viscosity at 25° C, cp. | 3574 |
| Molecular wt | 1333 |

The following table shows the procedure and results of similar examples in which the amount of propanol, temperature and time of feeding, holding and finishing, if used, and method of recovery were varied to study the effect of these variables on the resultant product.

TABLE II
PREPARATION OF PHOSPHONITRILATE POLYMER

| Example No. | 1 | 2 | 3 | 4 | 5 | 6 | 7 | 8 |
|---|---|---|---|---|---|---|---|---|
| PrOH, % Theo. | 85 | 98 | 98 | 98 | 98 | 110 | 110 | 110 |
| Temp.-Time, ° C-hrs. | | | | | | | | |
| Feeding | 22- 2 | 22- 2 | 22- 2 | 22- 2 | 22- 2 | 22- 2 | 22- 2 | 22- 2 |
| Holding | 22-24 | 22-24 | 22-48 | 22-120 | 22-120 | 22-24 | 22-24 | 22-48 |
| Heating | 50- 0.5 | 50- 0.5 | 50- 0.5 | 50- 0.5 | 50- 0.5 | 50- 0.5 | — | 50- 1 |
| Total Time | 26.5 | 26.5 | 50.5 | 122.5 | 122.5 | 26.5 | 26 | 51 |
| Recovery Method* | A | A | A | A | A | A | B | B |
| Product Viscosity at 25° C, cp | 3574 | 2034 | 2673 | 3632 | 3255 | 1007 | 1025 | 1400 |
| Molecular Wt. | 1333 | 1381 | 1377 | 1453 | 1441 | 1239 | 1261 | 1256 |
| Cl, Wt % | 5.8 | 4.13 | 2.86 | 1.77 | 1.53 | 3.12 | 3.11 | 1.7 |
| P, Wt % | 22.2 | 22.0 | 22.1 | — | 21.8 | 21.3 | 21.1 | — |
| Yield, % | — | — | — | — | — | — | — | — |
| Comments | | | | | Heptane wash | | | |

| Example No. | 9 | 10 | 11 | 12 | 13 | 14 | 15 | 16 |
|---|---|---|---|---|---|---|---|---|
| PrOH, % Theo, | 110 | 98 | 98 | 98 | 98 | 98 | 98 | 100 |
| Temp.-Time, ° C-hrs. | | | | | | | | |
| Feeding | 22- 2 | 22- 2 | 22- 2 | 22- 2 | 22-2 | 30-2 | 22-2 | 22- 2 |
| Holding | 22-48 | 22-24 | 22-24 | 22-48 | 30-0.5 | 30-0.5 | 22-16 | 22-17.5 |
| Heating | — | — | 60- 1 | — | 50-2 | 50-2 | 60- 2 | — |
| Total Time | 50 | 26 | 27 | 50 | 0 4.5 | 4.5 | 20 | 19.5 |
| Recovery Method* | B | B | B | B | B | B | B | C |
| Product Viscosity at 25° C, cp | 1280 | 2760 | 19,900 | 648 | 1670 | 4500 | 1714 | 2993 |
| Molecular Wt. | 1284 | 1013 | 1084 | 975 | 1345 | 1602 | 1378 | 1388 |
| Cl, Wt % | 1.88 | 5.79 | 1.82 | — | 7.38 | 7.74 | 4.46 | 4.88 |
| P, Wt % | — | — | 22.8 | — | — | — | — | 21.6 |
| Yield, % | — | — | — | — | 64 | 48 | 79 | 92 |
| Comments | | 70% Monochlorobenzene | | 70% Monochlorobenzene | | pH =14 | | 0.32% Water soluble Cl, 2% trimer |

| Example No. | 17 | 18 | 19 | 20 | 21 | 22 | 23 |
|---|---|---|---|---|---|---|---|
| PrOH, % Theo. | 100 | 100 | 100 +30 | 100 | 100 | 100 +20 | 110 |
| Temp.-Time, ° C-hrs. | | | | | | | |
| Feeding | 22-2 | 10-2 | 10-2 | 10-2 | 20-2 | 20-2 | 30-0.5 |
| Holding | 22-17.5 | 25-17 | 25-17+3 | 25-17+3 | 30-15 | 30-15 | 30-1 |
| Heating | 60-2 | — | — | — | — | 52.5 | 40-3 |
| Total Time | 21.5 | 19 | 22 | 22 | 17 | 22 | 4.5 |

TABLE II-continued
PREPARATION OF PHOSPHONITRILATE POLYMER

| Recovery Method* | C | C | C | D | D | D | D |
|---|---|---|---|---|---|---|---|
| Product Viscosity at | | | | | | | |
| 25° C, cp | 4039 | 446 | 622 | 550 | 1637 | 1576 | 446 |
| Mol. Wt. | 1398 | 945 | 963 | 968 | 1310 | 1323 | 1030 |
| Cl, Wt. % | 3.63 | 4.37 | 2.77 | 2.57 | 3.46 | 2.05 | 5.25 |
| P, Wt. % | 21.8 | 21.3 | — | 21.3 | 22.15 | 21.5, 21.3 | 21.6 |
| Yield, % | 89 | — | — | — | — | — | 90 |
| Comments | 0.43% Water soluble Cl, 0.45% Na, 9.87% N | (1) | (2) | Wash w/ water, no water soluble Cl | Water soluble Cl < 0.05% | | |

| Example No. | 24 | 25 | 26 | 27 | 28 | 29 | 30 |
|---|---|---|---|---|---|---|---|
| PrOH, % Theo. | 110 | 110 | 110 | 110 | 110 | 130 | 150 |
| Temp.-Time, ° C-hrs. | | | | | | | |
| Feeding | 30-0.5 | 25-2 | 25-2 | 30-3 | 40-2 | 30-2.5 | 30-3 |
| Holding | 30-1 | 24-18 | 24-18 | 48-18 | 40-1 | 30-1 | 30-1.5 |
| Heating | 40-22.5 | — | 80-3 | — | 70-4 | 50-3 | 50-2 |
| Total Time | 24 | 20 | 23 | 21 | 7 | 6.5 | 6.5 |
| Recovery Method* | D | D | D | D | D | D | D |
| Product Viscosity at | | | | | | | |
| 25° C, cp | 421 | 928 | 6044 | V.H. | Solid | 10,170 | 16,190 |
| Mol. Wt. | 940 | 1105 | 1226 | 1723 | — | 1689 | 1706 |
| Cl, Wt.% | 1.51 | 3.70 | 1.62 | 3.16 | 5.03 | 4.67 | 5.04 |
| P, Wt. % | 21.0 | 21.8 | 21.43 | 21.97 | 22.55 | 22.8 | 22.4 |
| Yield, % | 90 | — | 94 | — | — | — | — |

| Example No. | 31 | 32 | 33 | 34 | 35 | 36 |
|---|---|---|---|---|---|---|
| PrOH, % Theo. | 130 | 130 | 130 | 130 | 130 | 130 |
| Temp.-Time, ° C-hrs. | | | | | | |
| Feeding 30-2 | 30-2 | 30-1.67 | 30-1.67 | 30-1 | 30-1.67 | |
| Holding | 30-2 | 30-2 | 30-2.33 | 30-2.33 | 25-20 | 30-2.33 |
| Heating | 50-2.5 | 50-8 | 50-2.5 | 50-.85 | — | 50-8 |
| Total Time | 6.5 | 12 | 6.5 | 12.5 | 21 | 12 |
| Recovery Method* | D | E | D | D | D | D |
| Product Viscosity at | | | | | | |
| 25° C, cp | 6538 | 16,912 | 3162 | 6102 | 1452 | 3807 |
| Mol. Wt. | 1476 | 1680 | 1427 | 1380 | 1287 | 1371 |
| Cl, Wt. % | 4.46 | 2.26 | 3.99 | 1.48 | 4.53 | 1.91 |
| P, Wt. % | 22.55 | 21.8 | 22.5 | 22.0 | 21.6 | 22.0 |
| Yield, % | 95 | 70 | 93 | — | 84 | — |
| Comments | | Water soluble Cl 0.51% | | Water soluble Cl 0.021%, N 9.90% | | Water soluble Cl 0.07%, Na 0.26% |

| Example No. | 37 | 38 | 39 | 40 | 41 | 42 |
|---|---|---|---|---|---|---|
| PrOH, % Theo. | 130 | 130 | 130 | 130 | 130 | 130 |
| Temp.-Time, ° C-hrs. | | | | | | |
| Feeding | 30-1.67 | 30-1.67 | 30-2 | 30-2 | 30-1.83 | 30-1.83 |
| Holding | 30-2.33 | 30-2.33 | 30-2 | 30-2 | 30-2.17 | 30-2.17 |
| Heating | 50-8 | 50-2.5 | 50-8 | 50-8 | 50-8 | 50-8 |
| Total Time | 12 | 6.5 | 12 | 12 | 12 | 12 |
| Recovery Method* | F | D | D | F | D | G |
| Product Viscosity at | | | | | | |
| 25° C, cp | 5230 | 423 | 12,500 | 20,400 | 13,831 | 15,582 |
| Mol. Wt. | 1374 | 965 | 1606 | 1553 | 1595 | 1567 |
| Cl, Wt. % | 1.61 | 4.53 | 1.36 | 1.75 | 2.26 | 1.86 |
| P. Wt. % | 22.2 | 22.4 | 21.4 | 22.2 | 22.0 | 22.3 |
| Yield, % | — | 83 | 85 | — | — | — |
| Comments | | Water soluble Cl 0.05% | | Water soluble Cl 0.05% | | |

*A Filter off pyridine . HCl, evaporate pyridine, wash with MCB/NaHCO$_3$ solution, evaporate.
*B Neutralize pyridine . HCl with 10% NaOH/heptane, separate phases, evaporate.
*C Neutralize pyridine . HCl with 16% NaOH/monochlorobenzene, separate phases, evaporate.
*D Neutralize pyridine . HCl with 16% NaOH/monochlorobenzene, wash with water, separate phases, evaporate.
(1) 4% Monochloropentapropoxyphosphazene, 6% trimer, 1% tetramer.
(2) 9% Trimer, 1% tetramer, no water soluble Cl.
*E Neutralize pyridine . HCl with 16% NaOH, wash with water, separate phases, evaporate.
*F Neutralize pyridine . HCl with 16% NaOH/monochlorobenzene, stand overnight, wash with water, separate phases, evaporate.
*G Neutralize pyridine . HCl with 16% NaOH/monochlorobenzene, wash with water, stand overnight, separate phases, evaporate.

In Examples 10 and 11, a large amount of monochlorobenzene was left in the phosphonitrilic chloride. The products had higher viscosity compared to molecular weight indicating a rearranged product. In Example 12, the neutralization went too far to a pH of 14 and the product which should have been similar to Example 9 was apparently degraded into lower viscosity and molecular weight material.

In Examples 18, 19 and 20, the feed temperature was too low for the times normally employed at higher temperatures and resulted in product with low molecular weights and viscosities. In Examples 23 and 24, although the feed temperature was high enough, the feed time was relatively short, giving materials with lower viscosities. In Example 27, the relatively long feed time at the temperature employed significantly increased the viscosity indicating a thermally rearranged product. In Example 28, the feed temperature was too high for the time of reaction producing a solid product. Comparison of Examples 10–12, 18, 19, 20, 23, 24, 27 and 28 with the other examples indicates the relationship of viscosity and molecular weight to the feed temperature and as hydroxyl concentration expressed as feed time. It is therefore clear that the proper control of these variables can produce products which have advantageous properties of viscosity and molecular weight and which can be controlled for best advantage as desired.

The following examples illustrate large scale runs of the process of this invention.

EXAMPLE 43

Into a glass-lined 30-gallon reactor was charged 148 pounds of monochlorobenzene and 65 pounds of phosphorus trichloride. The reactor stirrer was started and the reactor contents heated to about 27° C and the pressure was atmospheric. To the reactor was charged 36 pounds of gaseous chlorine over a period of one hour and ten minutes. The reactor temperature increased to about 55° C and was maintained during chlorine feed at from 55° to about 60° C. The reactor pressure was controlled at from about 2 to about 3.8 psig.

The reactor was pressurized with HCl up to about 13 psig. Gaseous ammonia, 8.4 pounds, was added over a period of 4 hours and 10 minutes. The temperature was maintained at about 140° C and the pressure at 20 psig by venting HCl to a water scrubber. The ammonia feed was stopped and the reactor pressure and temperature were maintained for 30 minutes. Then the reactor was vented for 20 minutes to remove HCl and the pressure was decreased to 20 psig during the venting period. The reactor contents were then cooled. The unfiltered product phosphonitrilic chloride weighed 201.5 pounds. The product was then filtered to remove NH$_4$Cl and the monochlorobenzene solvent was stripped from the phosphonitrilic chloride and 128 pounds of solvent were recovered. Stripping was carried out for 2 hours and 25 minutes at temperatures from about 24° C up to 77° C and pressure of from 50 mm Hg to 1 mm Hg.

Then 160 pounds of pyridine was added to the reactor. The reactor contents were heated to 22° C and 42.5 pounds of propanol was fed into the reactor with stirring over a period of 1 hour and 47 minutes. The temperature varied from about 17° to about 22° C during the feed period. The propanol feed was completed and the reaction mixture held at 22° to about 30° C for 15 hours. At this point, another 8 pounds of propanol was fed into the reaction mixture during 10 minutes at 30° C. This amounted to about 10 weight percent over theoretical amount of propanol. The reaction mixture was further heated at about 57° to about 63° C for 4½ hours to finish off the reaction. The reactor contents were cooled to about 22° C and left with stirring for 64 hours. Temperature ranged from 22° to about 27° C during this period.

Then the reactor contents were cooled to ambient temperature and 140 pounds of monochlorobenzene was added. After stirring, there was added 168 pounds of 16 weight percent sodium hydroxide solution to neutralize the reaction mixture. The final mixture had a pH of 7.6 after neutralization. The bottom brine solution was drained and weighed 204 pounds containing water, salts and rag layer. A second wash using 25 pounds of water was conducted and 48 pounds of pyridine and water were recovered from the top layer.

The product solution was heated to 101° C under vacuum of 10 to 1 mm Hg for 3 hours. Recovery of pyridine and monochlorobenzene from the condenser was 272.5 pounds. The product weighing 46.8 pounds is recovered from the reactor.

Analysis of the phosphonitrilate polymer product gave the following results:

| | |
|---|---|
| P, wt % | 21.4 |
| N, wt % | 9.75 |
| Total Cl, wt % | 0.57 |
| Water soluble Cl, wt % | 0.14 |
| Na, wt % | 0.21 |
| Viscosity at 25° C, cp | 2232 |
| Molecular weight | 1190 |
| Specific gravity, g/cm$^3$ | 1.16 |
| Gardner color | 11–12 |
| Acid No. (mg. KOH/g) | 23 |
| Water solubility (wt % P) | 0.10 |
| 0.5% NaOH solubility (wt % P) | 0.47 |

EXAMPLE 44

To a 30-gallon jacketed glass-lined reactor was charged 65 pounds of PCl$_3$ and 148 pounds of monochlorobenzene. The reactor contents were cooled to 17° C, the stirrer was started and chlorine was fed into the reactor contents. The temperature increased to about 57° C during chlorine feed and a total of 37.5 pounds of chlorine was charged. Pressure of the reactor went from atmospheric to 3 psig.

The reactor was pressurized with HCl to about 19.0 psig and 8 pounds of gaseous ammonia was fed into the reactor. The temperature went from 18° C to about 106° C during the first feeding of ammonia and then was controlled at from 127° C to about 137° C. The ammonia was fed over a period of 3 hours and 40 minutes. The ammonia feed was stopped and the temperature was maintained for 1 hour while the pressure was decreased and the HCl vented. HCl was vented during the reaction to maintain the reactor pressure at about 17 psig. After the ammonia feed was stopped and the HCl vented for 1 hour the reactor contents were cooled to ambient temperature. The unfiltered phosphonitrilic chloride solution weighed 198.5 pounds. The ammonium chloride was filtered off. Stripping of the monochlorobenzene was begun, but a leak in the overhead condenser prevented accurate determination of the amount of monochlorobenzene stripped. Stripping was conducted at 140°–142° C for two and one-half hours and then the reactor contents were cooled.

To the reactor was added 150 pounds of pyridine. The stirrer was started and 66 pounds of propanol was added to the stirred reaction mixture at about 20° C. The reactor temperature was then controlled at 27° C to about 32° C during propanol feed over a period of 1 hour and 40 minutes. The amount of propanol fed was about 130 weight percent of the theoretical amount. The reactor was maintained at from 27° to about 34° for 2 hours after propanol feed was completed and then heated to 49° to about 55° C for about 8 hours. The reaction mixture was then cooled.

To the reactor was added 140 pounds of monochlorobenzene. The reaction mixture was then neutralized with 176 pounds of 16 percent NaOH solution. After neutralization, the reaction mixture had a pH of 7.6. From the reactor was recovered 195 pounds of brine containing water and salt and 20 pounds of rag. A second wash with 50 pounds of water allowed recovery of 108.5 pounds of pyridine-water solution from the top layer.

The reactor was then heated to 96° C over a period of about 3 hours at pressure of from 10 to 15 mm Hg to strip the pyridine and monochlorobenzene from the product. About 248.5 pounds of pyridine and monochlorobenzene were recovered. Product phosphonitrilate polymer was 47.2 pounds.

Analysis of the product gave the following results:

| | |
|---|---|
| P, wt % | 21.5 |
| N, wt % | 9.70 |
| Total Cl, wt % | 1.12 |
| Water soluble Cl, wt % | 0.07 |
| Na, wt % | 0.09 |
| Viscosity at 25° C, cp | 2069 |
| Molecular weight | 1223 |
| Specific gravity, g/cm$^3$ | 1.16 |
| Gardner color | 6 |
| Acid No. (mg. KOH/g) | 24.1 |
| Water solubility (wt % P) | 0.02 |
| 0.5% NaOH solubility (wt % P) | 0.37 |

Accordingly, from the foregoing examples, it can be seen that the product phosphonitrilate polymer can be produced having a viscosity from about 900 to about 20,000 cp at 25° C, preferably from 1000 to about 7000, and a molecular weight of from about 900 to about 1700 and preferably from 1000 to about 1600.

A particularly preferred embodiment is a process according to this invention comprising reacting, in the presence of pyridine, a phosphonitrilic chloride with propanol according to the steps of adding from about 98 to about 130 weight percent of the theoretical amount of propanol to the phosphonitrilic halide at a temperature of about 20° to about 30° C over a period of from about 1 to about 3 hours, maintaining the reaction mixture at about 20° to about 30° C for a period of about 1 to about 2 hours and then further heating the reaction mixture to from about 50° to about 55° C for a period of from about ½ to about 8 hours.

A most highly preferred embodiment of this invention is a product produced by the process of this invention. Also, phosphonitrilate polymers prepared by the process as described and exemplified above can be used as flame retardants for cellulosic materials, including fiber, filament, staple yarn, fabrics and films. The phosphonitrilate polymers can be added by dipping, spraying, or other means utilized for treating the surface.

Preferably, for rayon and other regenerated cellulosics, the fire retardants may be impregnated or added to the product by incorporating into the viscose prior to spinning. The amount of fire retardant used can be from 1 to about 30 weight percent, and preferably from 2 to about 20 weight percent.

For impreganation prior to spinning and the finished materials, reference is made to U.S. Pat. No. 3,455,713 to Godfrey. That patent is incorporated by reference herein as if fully set forth. Thus, one method of flame retarding cellulose filaments is to use the phosphonitrilate polymers produced according to this invention in the method of Godfrey supra. Likewise, the instant invention provides regenerated cellulose fibers, filaments, filamentary articles and fabrics prepared from the phosphonitrilate polymeric flame retardants herein provided utilizing the techniques of Godfrey.

In obtaining satisfactory fire retardance, an extremely important criteria is how well the fire retardant material is retained in the fiber or filament during processing. If the fire retardant agent is lost during processing, it has no chance to pass the strigent U.S. Government test standards, such as the Children's Sleepwear Standard, DOC FF 3-71, which requires testing of the finished end product in new condition and after 50 washings in household machines.

To illustrate the superior retention of the products produced by the process of this invention, the phosphonitrilate polymer of Example 43 was added to viscose at several concentrations, spun into filament and processed conventionally. The viscose mixture was spun into aqueous coagulating and regenerating bath containing aqueous sulfuric acid and other conventional components, for example, metal sulfates. Further processing includes washing, desulfurizing, bleaching, etc. The following results were obtained during processing of the filament:

| Retention of Phosphonitrilate Polymer in Rayon Filament During Processing | | |
|---|---|---|
| Loading of Phosphonitrilate Polymer of Example 43 in Viscose, wt % | Wt % P Retained in Rayon | |
| | Acid Free Yarn | Washed Yarn |
| 13.1 | 98.5 | 91.0 |
| 16.7 | 100 | 96.7 |
| 20.0 | 98.4 | 92.2 |

The extremely good retention of the phosphonitrilate polymer at such low concentrations indicates that the phosphonitrilate polymer will provide excellent flame retardance for the rayon fabric woven or knit therefrom.

The flame retardant effectiveness of products made in Examples 43 and 44 was evaluated by the Children's Sleepwear Test, DOC FF 3-71, in both filament-knit fabric and staple yarnwoven fabric. The char lengths are recorded below:

| Product From | Viscose Loading (wt %) | Fab. Wt. (oz/yd$^2$) | Type Fabric | Avg.$^c$ Char Length (in.) After 50 Launderings |
|---|---|---|---|---|
| Ex. 43 | 13.1 | 6–7$^a$ | Filament-Knit | 3.8 |
| | 16.7 | 6–7$^a$ | Filament-Knit | 0.6 |
| | 20.0 | 6–7$^a$ | Filament-Knit | 1.0 |
| | 20.0 | 4.0 | Filament-Knit | 2.9 |
| Ex. 44 | 25$^b$ | 3.5 | Staple Yarn-woven | 2.7 W$^d$ |
| | | | | 5.5 F$^d$ (2 Failures) |

NOTES:
$^a$Actual weight of fabric no reported, believed to be in 6–7 oz/yd$^2$ range.
$^b$Based on cellulose.
$^c$Average of 5 samples.
$^d$Tested in warp direction, tested in fill direction.

Accordingly, the products produced by the process of this invention have excellent effectiveness even after 50 launderings.

What is claimed is:

1. Regenerated cellulose filaments and articles having dispersed therein a flame retardant amount of a phosphonitrilate polymer prepared according to the process comprising reacting, in the presence of an amount of an acid acceptor sufficient to complex with at least twice the molar amount of hydrogen halide formed, a phosphonitrilic halide with a hydroxyl compound selected from aliphatic alcohols having from one to about six carbon atoms and aromatic alcohols having from six to about ten carbon atoms according to the steps of
    (a) contacting a mixture of said phosphonitrilic halide and said acid acceptor with at least about 85 to about 180 weight percent of the theoretical amount based on said phosphonitrilic halide of said hydroxyl compound at a temperature of not more than about 40° C, whereby a relatively low concentration of said hydroxyl compound is present during the initial ½ to about 3 hours of the reaction and whereby condensation occurs between intermediate phosphonitrilate alkoxy or aryloxy ester species and phosphonitrilic halides or partially esterified phosphonitrilates with the evolution of an alkyl or aryl halide compound, and (b) thereafter, maintaining the reaction mixture at a temperature of from about 20° to about 50° C for a period of from about ½ to about 120 hours.

2. A method of preparing a flame retardant regenerated cellulose filament which comprises mixing viscose and a flame retardant amount of a phosphonitrilate polymer, shaping the mixture into a filament, and coagulating and regenerating said filament, said phosphonitrilate polymer being prepared by a process comprising reacting, in the presence of an amount of an acid acceptor sufficient to complex with at least twice the molar amount of hydrogen halide formed, a phosphonitrilic halide with a hydroxyl compound selected from aliphatic alcohols having from one to about six carbon atoms and aromatic alcohols having from six to about ten carbon atoms according to the steps of (a) contacting a mixture of said phosphonitrilic halide and said acid acceptor with at least about 85 to about 180 weight percent of the theoretical amount based on said phosphonitrilic halide of said hydroxyl compound at a temperature of not more than about 40° C, whereby a relatively low concentration of said hydroxyl compound is present during the initial ½ to about 3 hours of the reaction and whereby condensation occurs between intermediate phosphonitrilate alkoxy or aryloxy ester species and phosphonitrilic halides or partially esterified phosphonitrilates with the evolution of an alkyl or aryl halide compound, and (b) thereafter, maintaining the reaction mixture at a temperature of from about 20° to about 50° C for a period of from about ½ to about 120 hours.

* * * * *

UNITED STATES PATENT OFFICE
CERTIFICATE OF CORRECTION

PATENT NO. : 4,081,593
DATED : March 28, 1978
INVENTOR(S) : Carroll W. Lanier and James T. F. Kao It is certified that error appears in the above-identified patent and that said Letters Patent are hereby corrected as shown below:

Column 9, Table II, on "Comments" line, under Example 11, insert -- 70% Monochlorobenzene --; Column 9, Table II, on "Comments" line, under Example 12, delete "70% Monochlorobenzene" and substitute -- pH=14 --; Column 9, Table II, on "Comments" line, under Example 14, delete "pH=14"; Column 11, Table II, under "Example No.", second occurrence, "Feeding 30-2" should read -- Feeding --; Column 11, Table II, on "Feeding" line, under Example 32, delete "30-1.67" and substitute -- 30-2 --; Column 11, Table II, on "Feeding" line, under Example 34, delete "30-1" and substitute -- 30-1.67 --; Column 11, Table II, on "Feeding" line, under Example 35, delete "30-1.67" and substitute -- 30-1 -- Column 11, Table II, on "Feeding" line, under Example 36, insert -- 30-1.67 --; Column 11, Table II, on "Comments" line, under Example 37, insert -- Water soluble Cl 0.05% --; Column 11, Table II, on "Comments" line, under Example 38, delete "Water soluble Cl 0.05%".

Signed and Sealed this

Tenth Day of October 1978

[SEAL]

Attest:

RUTH C. MASON
Attesting Officer

DONALD W. BANNER
Commissioner of Patents and Trademarks